United States Patent
Brailean et al.

[11] Patent Number: 6,134,237
[45] Date of Patent: *Oct. 17, 2000

[54] METHOD AND APPARATUS FOR TRACKING DATA PACKETS IN A PACKET DATA COMMUNICATION SYSTEM

[75] Inventors: Karen A. Brailean, Park Ridge; Robert F. Boxall, Morton Grove, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/940,299

[22] Filed: Sep. 30, 1997

[51] Int. Cl.$^7$ .................................................. G01R 31/08
[52] U.S. Cl. ........................ 370/394; 370/474; 370/242
[58] Field of Search .................................. 370/394, 384, 370/242, 245, 248, 349; 455/464; 380/270; 709/225; 375/222

[56] References Cited

U.S. PATENT DOCUMENTS

| | | | |
|---|---|---|---|
| 4,665,519 | 5/1987 | Kirchner et al. | 370/349 |
| 4,739,321 | 4/1988 | Friedman et al. | 340/825.5 |
| 5,165,091 | 11/1992 | Lape et al. | 370/216 |
| 5,297,203 | 3/1994 | Rose et al. | 380/270 |
| 5,337,313 | 8/1994 | Buchholz et al. | 370/394 |
| 5,371,783 | 12/1994 | Rose et al. | 455/464 |
| 5,751,719 | 5/1998 | Chen et al. | 370/473 |
| 5,875,292 | 2/1999 | Taketsugu | 370/474 |

*Primary Examiner*—Hassan Kizou
*Assistant Examiner*—John Pezzlo
*Attorney, Agent, or Firm*—Daniel C. Crilly; Steven A. May; Jeffrey K. Jacobs

[57] ABSTRACT

A packet data communication system (100) employs a method and apparatus for tracking data packets in the packet data communication system. A sending communication device (e.g., 101) transmits a data packet (130) to a receiving communication device (e.g., 105), wherein the data packet includes a respective packet sequence number (131). Responsive to the transmission, the sending device increases a transmit tracking number (V(S)) that is used to indicate the packet sequence number of the data packet that is next in sequence to be transmitted. Upon receiving the data packet, the receiving device transmits an acknowledgment data packet (140) to the sending device, wherein the acknowledgment data packet includes a receive tracking number (139). The receive tracking number indicates the packet sequence number of the data packet that the receiving device expects to receive next. Upon receiving the acknowledgment data packet, the sending device determines whether a communication error occurred based on the receive tracking number and the transmit tracking number.

18 Claims, 3 Drawing Sheets

METHOD AND APPARATUS FOR TRACKING DATA PACKETS IN A PACKET DATA COMMUNICATION SYSTEM

CROSS-REFERENCE TO RELATED APPLICATIONS

This application is related to U.S. Pat. No. 5,872,777.

FIELD OF THE INVENTION

The present invention relates generally to communication systems and, in particular, to tracking data packets conveyed between communication devices in a packet data communication system.

BACKGROUND OF THE INVENTION

Packet data communication systems are known in both the wireless and wireline environments. In the wireless environment, a packet data system includes packet data routers, data controllers, base stations, and wireless communication units (e.g., mobile radios, portable radios, radiotelephones, or wireless data terminals). In the wireline environment, a packet data system includes switches and wireline communication devices (e.g., personal computers, computer servers, mainframes, laptop computers, personal communication devices, or custom data terminals). Packet data communications are also known to exist between wireless and wireline systems.

Packet data communications rely on accurate tracking of the data packets transmitted from one device to another. Accurate tracking of transmitted and received data packets is crucial to insure that a complete data communication is indeed transmitted by a sending device (e.g., a base station) and received by a receiving device (e.g., a portable radio). Data packets are typically tracked by monitoring a packet sequence number contained in the data packet to be transmitted or that was most recently received. Each data packet includes a packet sequence number to indicate the sequence location of the data packet with respect to other data packets that constitute the complete data communication. Thus, by comparing the packet sequence number of the received data packet with an expected packet sequence number, the receiving device can determine whether the sending device transmitted the correct packet.

To assist the sending device in its attempt to transmit the correct data packet, the receiving device transmits an acknowledgment of received data packets that indicates the packet sequence number (receive tracking number) of the data packet the receiving device next expects to receive. Accordingly, by comparing the receive tracking number of the acknowledgment with a packet sequence number (transmit tracking number) of the next data packet expected to be transmitted, the sending device can determine whether it is about to transmit the data packet the receiving device expects to receive and, if the sending device is not about to transmit such a data packet, the sending device can correct its packet transmission sequence to conform with the receiving device's wishes.

Although the above process for tracking and validating data packets in a packet data communication system works fairly well, tracking problems can occur due to communication errors in the system. For example, a processor in the sending device typically increments the transmit tracking number upon delivery of a data packet to the sending device's transmitter. However, depending upon the system configuration and the allocation of priorities in the system, the sending device might not actually transmit the data packet for a substantial length of time (e.g., several seconds) after receiving it from the processor. For example, in integrated voice and data radio systems, voice traffic is generally given priority over data traffic. Thus, if voice traffic is heavy, the data packet will remain in the sending device's transmit buffer until voice activity decreases by an amount sufficient to allow communication channels to be granted for data traffic.

During the time when the data packet is buffered, the receiving device may incur a communication protocol error and transmit an acknowledgment packet that indicates that the next packet to be received is the data packet the sending device's transmit tracking number indicates is the next packet to be sent. If, during the time when the data packet is buffered, the sending device receives the acknowledgment, the sending device would not detect the communication error present in the receiving device because the transmit tracking number in the sending device matches the errant receive tracking number in the acknowledgment. The receive tracking number in the acknowledgment is errant because the packet sequence number of the data packet indicated as being next in sequence to be received is larger than the packet sequence number of the packet stored in the sending device's transmit buffer. Consequently, the sending device would continue sending data packets to a corrupted receiving device instead of identifying a fault in the receiving device and terminating the data communication.

Therefore, a need exists for a method and apparatus of tracking data packets in a packet data communication system that more accurately facilitates the detection of communication errors that occur in the system.

DESCRIPTION OF A PREFERRED EMBODIMENT

Generally, the present invention encompasses a method and apparatus for tracking data packets in a packet data communication system. A first communication device transmits a data packet to a second communication device, wherein the data packet includes a respective packet sequence number. Responsive to the transmission, the first communication device increases a transmit tracking number that is used to indicate the packet sequence number of the data packet that is next in sequence to be transmitted. Upon receiving the data packet, the second communication device transmits an acknowledgment data packet to the first communication device, wherein the acknowledgment data packet includes a receive tracking number. The receive tracking number indicates the packet sequence number of the data packet that the second communication device expects to receive next. Upon receiving the acknowledgment data packet, the first communication device determines whether a communication error occurred based on the receive tracking number and the transmit tracking number.

By tracking data packets in this manner, the present invention prevents errant packet validation that can arise due to undetected communication protocol errors at either a sending communication device or a receiving communication device.

Figure 1:
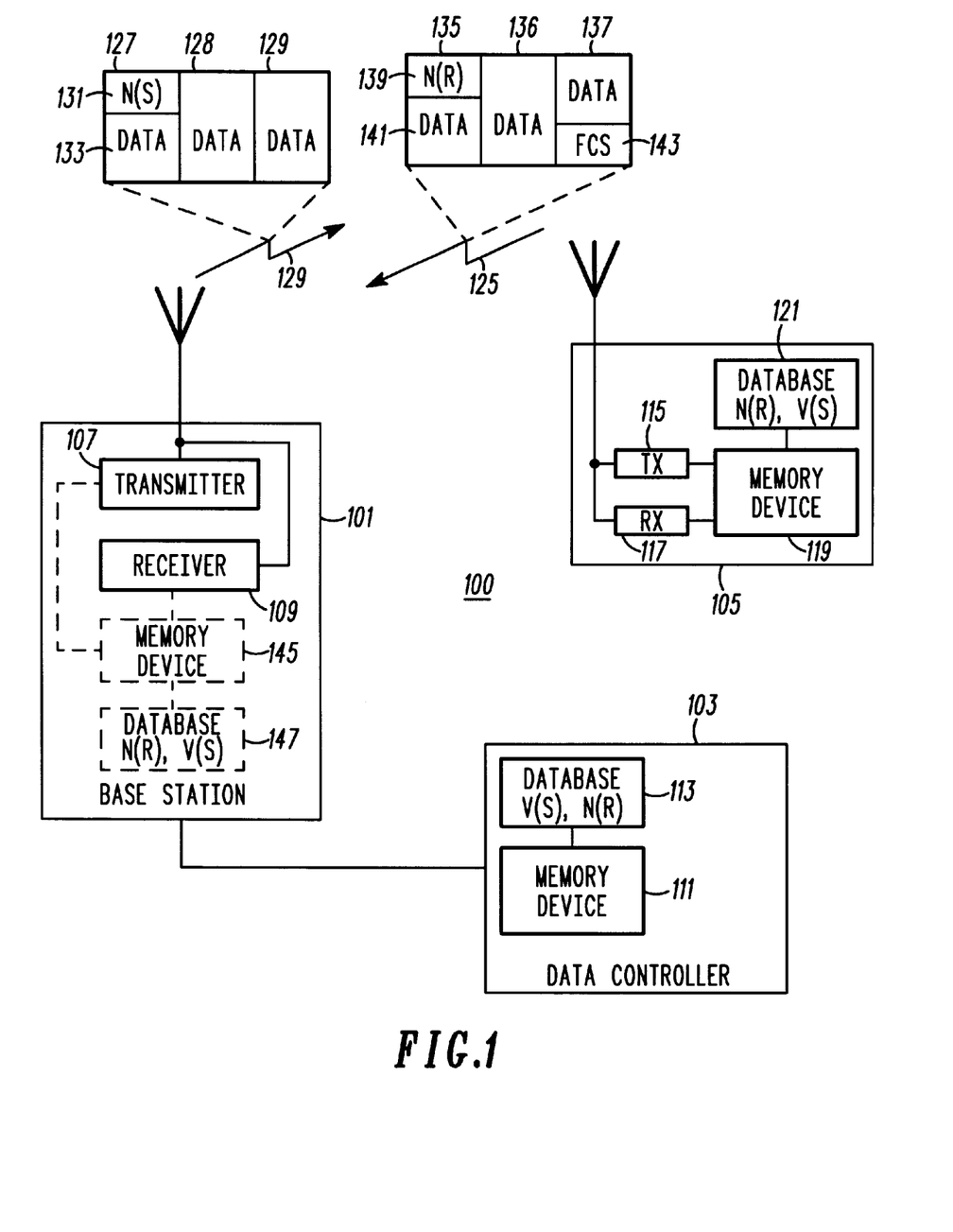
FIG. 1 illustrates a block diagram depiction of a packet data communication system in accordance with the present invention.
Figure 2:
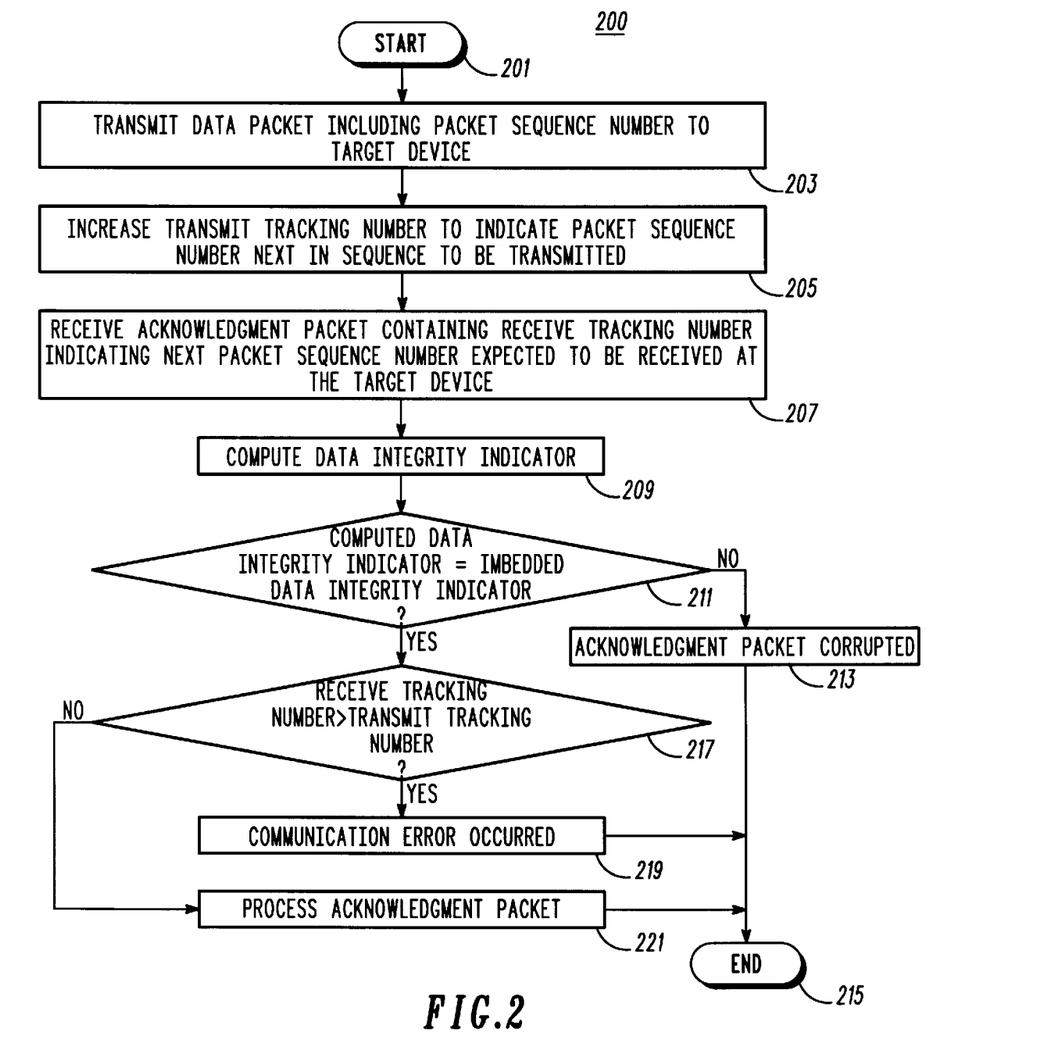
FIG. 2 illustrates a logic flow diagram of steps executed by a sending communication device to track data packets in accordance with the present invention.
Figure 3:
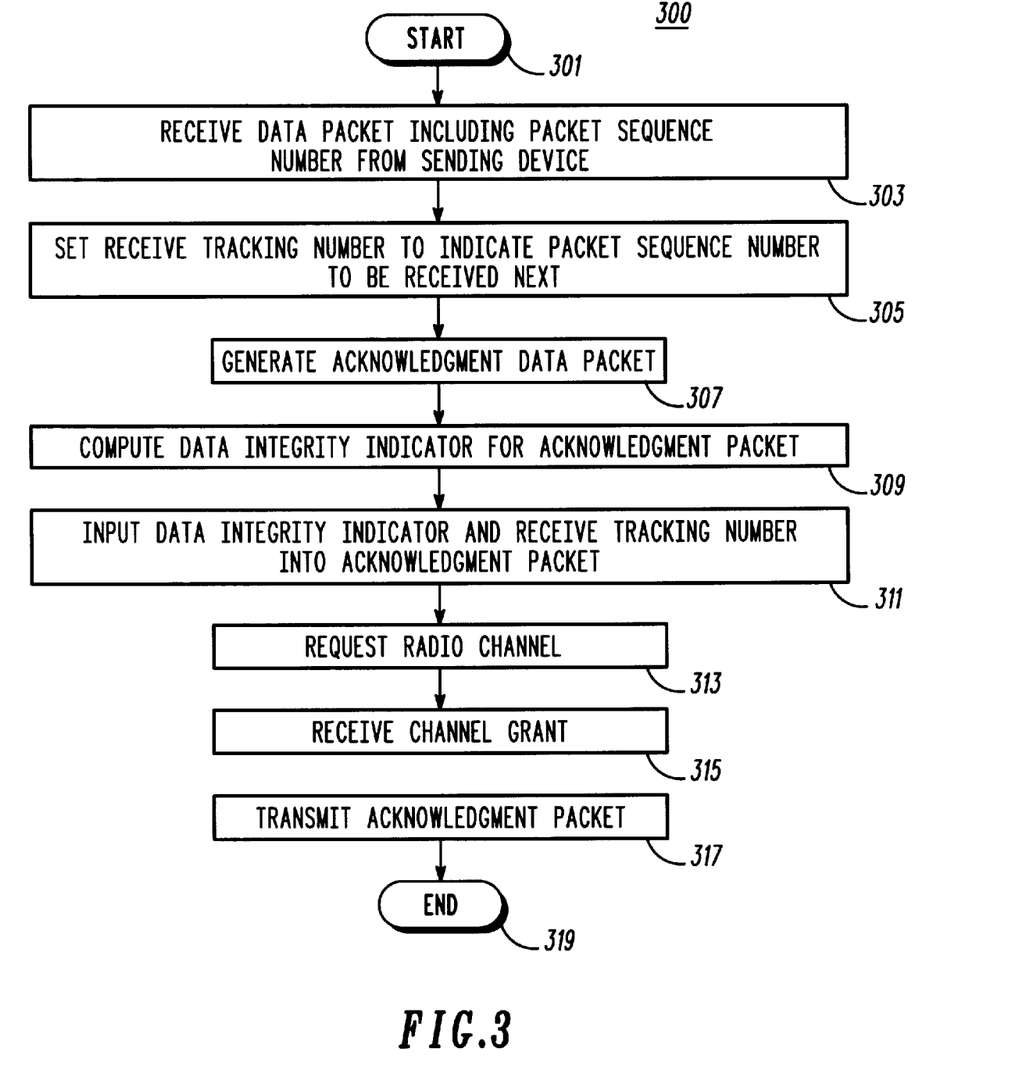
FIG. 3 illustrates a logic flow diagram of steps executed by a receiving communication device to track data packets in accordance with the present invention.

The present invention can be more fully understood with reference to FIGS. 1–3. FIG. 1 illustrates a block diagram depiction of a packet data communication system 100 in accordance with the present invention. The communication system 100 preferably includes a base station 101, a data controller 103, and a mobile or portable communication unit 105. The base station includes a transmitter 107 and a receiver 109, and preferably comprises an "iDEN" Base Repeater (BR) manufactured by Motorola, Inc. The data controller 103 includes a computer readable memory device 111 and a tracking database 113, and preferably comprises an "iDEN" "MOTOROLA" Data Gateway (MDG), which will be commercially available from Motorola, Inc. on or about Mar. 1, 1998. The communication unit 105 includes a transmitter (TX) 115, a receiver (RX) 117, a computer readable memory device 119, and a tracking database 121. The communication unit 105 preferably comprises a mobile or portable two-way radio or radiotelephone device, such as an "iDEN" mobile or portable radio.

The transmitters 107, 115 and receivers 109, 117 of the base station 101 and the communication unit 105 are well-known; thus, no further discussion of them will be provided. The computer readable memory devices 111, 119 of the data controller 103 and the communication unit 105 each preferably comprise a read only memory (ROM) for storing a computer program and a microprocessor to execute the stored computer program. However, in an alternative embodiment, each memory device 111, 119 might comprise another computer-readable storage medium, such as a random access memory (RAM), a programmable read only memory (PROM), a diskette, a hard disk, a PCMCIA memory card, a logic circuit, a mass storage medium, an optical disk, a CD-ROM, a magnetic disk, or a digital versatile disk (DVD). As described below, the computer programs stored in and executed by the memory devices 111, 119 perform most of the steps executed by the data controller 103 and the communication unit 105 in accordance with the present invention.

Operation of the packet data communication system 100 occurs substantially as follows in accordance with the present invention. When a sending communication device (such as the combination of the base station 101 and the data controller 103) desires to transmit one or more data packets to a receiving communication device (such as communication unit 105), the sending device requests and receives a radio communication channel 123 in accordance with known channel allocation techniques. In a preferred embodiment, the radio communication channel 123 comprises one or more outbound (base station-to-communication unit) time slots of an assigned outbound carrier frequency in a time division multiple access (TDMA) communication system, such as Motorola's iDEN telecommunication system. However, in an alternative embodiment, the communication channel 123 might comprise an outbound carrier frequency in a frequency division multiple access (FDMA) communication system or an orthogonal code (whether by direct sequence or via frequency hopping) in a code division multiple access (CDMA) communication system.

Upon receiving the channel grant, the data controller 103 conveys a data packet 130 to the base station 101. The data packet 130 includes a packet sequence number (N(S)) 131 and the associated data 133. The packet sequence number 131 indicates the data packet's sequential position within a multiple packet data communication or message. As shown in FIG. 1, the data packet 130 is preferably partitioned into a plurality of data blocks 127–129 to permit use of one of several known selective automatic repeat request (SARQ) protocols. In the preferred embodiment, the packet sequence number 131 is included as the first portion (e.g., the first seven bits of the second byte) of the first data block 127 in the data packet 130. However, in an alternative embodiment, the packet sequence number 131 may be placed in any data block of the data packet 130, provided that such placement is known to both the sending and receiving communication devices.

After the data packet 130 is received from the data controller 103, the base station 101 employs its transmitter 107 to encode the data packet 130 and transmit the encoded data packet to the communication unit 105 via the allocated communication channel 123. Once the data packet 130 is transmitted, the base station 101 sends a transmission confirmation message to the data controller 103. In response to the confirmation message, the data controller 103 increases a transmit tracking number (V(S)) stored in the tracking database 113 to indicate the packet sequence number of the next packet in sequence to be transmitted. For example, after the base station 101 confirms the transmission of the data packet 130 having packet sequence number five (i.e., N(S)= 5), the data controller 103 increments the transmit tracking number to six (i.e., V(S)=6) to indicate that the data packet having packet sequence number six is next in sequence to be transmitted.

It should be noted that although the above discussion suggests that the transmission of the data packet 130 by the base station 101 occurs directly after receipt of the data packet 130 from the data controller 103, such a scenario is an exception and not the rule. In practicality, the base station 101 may store the data packet 130 received from the data controller 103 for a substantial period of time (e.g., ten seconds when the data packet is one of the last packets of a large data message) prior to transmission. Such delays are incurred due to the priority of processing voice calls over data calls in integrated voice and data systems. Accordingly, a major aspect of the present invention is the delay in increasing the transmit tracking number until the data packet has been transmitted by the base station 101. By delaying the increase of the transmit tracking number until actual radio transmission of the preceding data packet, the present invention insures the accuracy of the transmit tracking number. By contrast, had the data controller 103 increased the transmit tracking number upon conveyance of the data packet 130 to the base station 101, the transmit tracking number would not accurately reflect the packet sequence number of the next data packet to be transmitted.

When the transmitted data packet 130 arrives at the communication unit 105, the communication unit 105 employs its receiver 117 to receive and decode the data packet 130. The communication unit 105 extracts the packet sequence number 131 and compares the packet sequence number 131 to the present value of a receive tracking number (N(R)) maintained in the communication unit's tracking database 121. The receive tracking number indicates the packet sequence number of the data packet that the communication unit 105 next expects to receive. When the packet sequence number equals the present value of the receive tracking number, the communication unit 105 increments the receive tracking number to identify the sequence number of the next packet to be received. For example, when the packet sequence number of five matches the receive tracking number, the communication unit increments the receive tracking number to six.

Upon receiving the data packet 130 and comparing the packet sequence number to the receive tracking number, the communication unit 105 employs its memory device 119 to generate an acknowledgment data packet 140. In a preferred embodiment, the acknowledgment packet 140 comprises a plurality of data blocks 135–137 and includes the updated receive tracking number 139, data 141 (e.g., new data of a single or multiple packet data transmission from the communication unit 105 to the base station 101 or, when using an SARQ protocol, data block numbers of unreceived or corrupted data blocks of the previously received data packet 130), and a data integrity indicator. In a preferred embodiment, the data integrity indicator comprises a known frame check sequence (FCS) 143 computed over the entire acknowledgment packet 140. Alternatively, the data integrity indicator might comprise a known cyclic redundancy check (CRC) computed over a single data block, in which case each data block 135–137 of the acknowledgment packet would include a data integrity indicator.

The FCS 143 is used by the data controller 103 to determine whether the acknowledgment packet 140 was corrupted during transmission. However, since the FCS 143 takes several milliseconds of processor time to compute, during which time additional data packets may be received by the communication unit 105, the memory device 119 preferably inserts a predetermined value (e.g., zero or all zeroes) into the portion of the particular data block 135 reserved for the updated receive tracking number and computes the FCS 143 on the acknowledgment packet containing the predetermined value. In an alternative embodiment, the communication unit 105 might compute the FCS 143 on the entire acknowledgment packet less the portion reserved for the receive tracking number. Upon computing the FCS 143, the memory device 119 inputs the FCS 143 into a reserved portion of a data block 137 of the acknowledgment packet 140.

Once the FCS 143 is computed, the communication unit transmits a request for, and receives a grant of, a radio communication channel 125. The type of radio communication channel requested and allocated (e.g., time slot, frequency carrier, or orthogonal code) preferably corresponds to the type of radio channel 123 allocated to the base station 101 for transmission of the data packet 130. Just prior to transmission of the acknowledgment packet 140 (either just prior to requesting the communication channel or upon receiving the channel grant, depending upon the speed of the processor employed in the memory device 119), the communication unit 105 replaces the predetermined value used to compute the FCS 143 with the updated receive tracking number or, in the alternative embodiment described above, inserts the receive tracking number into its reserved portion of a data block 135. By inserting the receive tracking number just prior to transmission, the present invention accounts for any data packets received during computation of the FCS 143 or while awaiting access to the communication channel 125. Once the acknowledgment packet 140 is completely configured, the communication unit 105 employs its transmitter 115 to encode the acknowledgment packet 140 and transmit the encoded acknowledgment packet to the base station via the radio communication channel 125.

When the transmitted acknowledgment packet 140 arrives at the base station 101, the base station 101 employs its receiver 109 to receive and decode the acknowledgment packet 140. In the preferred embodiment, the base station 101 provides the acknowledgment packet 140 to the data controller 103. Upon receiving the acknowledgment packet 140, the data controller 103 employs its memory device 111 to compute an FCS for the acknowledgment packet 140 to determine whether the information 139, 141, 143 in the acknowledgment packet 140 was corrupted during transmission. The FCS computation corresponds to the computation of the FCS 143 contained in the acknowledgment packet 140. That is, when the FCS 143 was computed as in the preferred embodiment (i.e., by inputting a predetermined value for the receive tracking number 139), the data controller 103 computes its FCS by replacing the receive tracking number 139 with the predetermined value and then computing the FCS. On the other hand, when the FCS 143 was computed as in the aforementioned alternative embodiment (i.e., by computing the FCS 143 on the entire acknowledgment packet 140 less a portion reserved for the receive tracking number 139), the data controller 103 computes its FCS by calculating an FCS on the entire acknowledgment packet 140 less the portion reserved for the receive tracking number 139.

Once the data controller 103 computes its FCS, the data controller 103 compares the computed FCS with the FCS 143 imbedded in the acknowledgment packet 140. When the computed FCS does not equal the imbedded FCS 143, the data controller 103 determines that the acknowledgment packet 140 was corrupted during transmission and prepares to retransmit the data packet being acknowledged or terminates the communication. When the computed FCS equals the imbedded FCS 143, the data controller 103 proceeds with its processing of the acknowledgment packet 140.

Upon successfully matching the computed FCS with the imbedded FCS 143, the data controller 103 determines whether the receive tracking number 139 is greater than the present transmit tracking number (V(S)). When the receive tracking number 139 is greater than the present transmit tracking number, the data controller 103 determines that a communication error occurred at some point in the transmission or reception of the acknowledgment packet 140 or the data packet 130. A communication error might comprise a software error in the communication unit 105, base station 101, or data controller 103. A communication error might also comprise corruption in the value of the receive tracking number due to noise and interference on the radio communication channel 125. When the receive tracking number 139 is less than or equal to the present transmit tracking number, the data controller 103 determines that no communication error occurred and begins its preparation to transmit a data packet having a packet sequence number equivalent to the receive tracking number 139.

It should be noted that the techniques described above also occur in reverse—i.e., when the sending communication device is the communication unit 105 (tracking database 121 is used in this case to determine the transmit tracking number, V(S)) and the receiving communication device is the combination of the base station 101 and the data controller 103 (tracking database 113 is used in this case to determine the receive tracking number, N(R)). It should further be noted that, in an alternative embodiment, the computer readable memory device 111 and the tracking database 113 might be positioned within the base station 101 as memory device 145 and database 147. In this case, the base station 101 alone would perform the tasks executed by both the base station 101 and the data controller 103 in the above discussion. Consequently, the use of the term communication device herein is intended to encompass any device (e.g., base station 101 or communication unit 105) or combination of devices (e.g., base station 101 and data controller 103) that include a transmitter, a receiver, a computer readable memory device, and a tracking database arranged, constructed, and programmed to perform the techniques described herein.

Moreover, although the method of the present invention was discussed above in the context of tracking and communicating data packets between infrastructure components (base station 101 and data controller 103) and mobile components (communication unit 105) of the system 100, the techniques of the present invention can also be applied to tracking data packets conveyed between two or more mobile communication devices or two or more stationary communication devices coupled together via a wireless or wireline communication channel.

As described above, the present invention provides for accurate tracking of data packets conveyed during a packet data communication. By updating the transmission tracking number after radio transmission of the data packet and inputting the receive tracking number into the acknowledgment just prior to transmission, the present invention substantially reduces the probability of introducing errors into the values of the transmit and receive tracking numbers resulting from the inherent delays that occur in the normal operation of the system components. In addition, by computing the acknowledgment's FCS without including the receive tracking number, the present invention provides for the use of common error detection techniques, while insuring that the receive tracking number can be inserted into the acknowledgment at the latest possible instant prior to transmission. Further, by waiting until transmission of the data packet to update the transmit tracking number, the present invention facilitates variable bandwidth data communications that can introduce substantial delays (on the order of seconds for long data packets conveyed in one time slot per frame over multiple frames) during transmission of a single, lengthy data packet (e.g., as in a file transfer).

FIG. 2 illustrates a logic flow diagram 200 of steps executed by a sending communication device in accordance with the present invention. The logic flow begins (201) when the sending device transmits (203) a data packet to a target device preferably via a radio communication channel, wherein the data packet includes a packet sequence number. As discussed above the packet sequence number indicates the sequential position of the data packet in a particular data communication or message. For example, a data message consisting of 100 data packets might include data packets having respective packet sequence numbers of 1 through 100. Thus, the packet sequence numbers allow the target device to properly reconstruct the data message from the received data packets.

Upon transmitting the data packet to the target device via a radio communication channel, the sending device increases (205) a transmit tracking number stored in a database to indicate the packet sequence number of the data packet that is next in sequence to be transmitted. Since data messages are often transmitted in portions, the sending device maintains a transmit tracking number to allow the sending device to determine which data packet is next in sequence to be transmitted when data transmission re-starts.

At some time after transmission of the data packet, the sending device receives (207) an acknowledgment packet from the target device, wherein the acknowledgment contains a receive tracking number that indicates the packet sequence number of the data packet that the target device next expects to receive. For purposes similar to the sending device's use of a transmit tracking number, the receiving device maintains and updates a received tracking number to permit it to determine which packet is next in sequence to be received.

Upon receiving the acknowledgment packet, the sending device computes (209) a data integrity indicator for the acknowledgment packet. In the preferred embodiment, the sending device replaces the receive tracking number with all zeros and then computes an FCS for the entire data packet, including the zeroed receive tracking number. In an alternate embodiment, the sending device might compute the FCS for the entire data packet less the portion containing the receive tracking number. Upon computing the data integrity indicator, the sending device determines (211) whether the computed data integrity indicator equals the value of an integrity indicator that is imbedded in the data packet. As discussed above, the receiving device computes a data integrity indicator, such as an FCS, prior to transmission of the acknowledgment packet and embeds the data integrity indicator into a portion of the acknowledgment packet. Thus, to determine whether the computed data integrity indicator equals the imbedded data integrity indicator, the sending device compares the computed data integrity indicator with the data integrity indicator imbedded in the acknowledgment packet.

When the computed data integrity indicator does not equal the imbedded integrity indicator, the sending device determines (213) that the acknowledgment packet is corrupted and either retransmits the acknowledged data packet or terminates the communication, thereby ending (215) the logic flow. However, when the computed data integrity indicator equals the imbedded integrity indicator, the sending device determines (217) whether the receive tracking number is greater than the transmit tracking number. When the transmit tracking number is greater than the receive tracking number, the sending device determines (219) that a communication error occurred and terminates the data communication, thereby ending (215) the logic flow. As stated above, the communication error might comprise a software error in either the sending device or the receiving device or corruption in the value of the receive tracking number due to noise and interference on the radio communication channel. When the receive tracking number is less than or equal to the transmit tracking number, the sending device processes (221) the acknowledgment packet (e.g., prepares the packet identified by the receive tracking number for transmission and forwards any new data in the acknowledgment packet to the appropriate target device) and the logic flow ends (215).

It should be noted that although the steps of computing the data integrity indicator and comparing the computed data integrity indicator to the imbedded data integrity indicator are described above as preceding the step of comparing the receive tracking number to the transmit tracking number, one of ordinary skill will appreciate that such steps may be performed in parallel using well-known parallel processing techniques. In addition, in a preferred embodiment, steps 205 and 209–219 of the above logic flow diagram 200 are performed by a computer program that is stored in a computer-readable memory device of the sending communication device.

FIG. 3 illustrates a logic flow diagram 300 of steps executed by a receiving communication device in accordance with the present invention. The logic flow begins (301) when the receiving device receives (303) a data packet from a sending communication device, wherein the data packet includes a packet sequence number. After determining the packet sequence number of the presently received data packet, the receiving device sets (305) a receive tracking number in its data base to indicate the packet sequence number of the next packet to be received. The next packet to be received may or may not be the packet next in sequence to the packet most recently received. For example, if packets 1, 2, 3, and 5 have been received already, and the most recently received data packet (i.e., the data packet received at block 303) has packet sequence number 4, the receiving device sets the receive tracking number to indicate packet sequence number 6 is the next packet expected to be received. However, when the previous packets have all been received in sequence, the receiving device sets the receive tracking number to indicate the next packet in sequence.

Upon setting the receive tracking number, the receiving device generates (307) an acknowledgment data packet that contains the receive tracking number and data (e.g., new data or SARQ information). Prior to transmitting the acknowledgment packet, the receiving device computes (309) a data integrity indicator for the acknowledgment data packet. In the preferred embodiment, this computation comprises an FCS calculated across all the data blocks of the acknowledgment packet. In the preferred embodiment, the receiving device inputs a predetermined value (e.g., zero) into a portion of a predetermined data block of the acknowledgment packet reserved for the receive tracking number. That is, the receiving device inputs a predetermined value into the portion of the acknowledgment packet that will, upon transmission, include the receive tracking number.

The FCS computation is then performed with the predetermined value (i.e., without the actual receive tracking number) in the acknowledgment packet in order to allow the receiving device to input the receive tracking number into the acknowledgment packet at as late a time as possible prior to transmission of the acknowledgment packet. In this manner, the receiving device is able to acknowledge the most recently received data packet without having to recompute the data integrity indicator. Since the data integrity indicator may take as long as ten milliseconds to compute, the receiving device may receive another data packet during computation of the data integrity indicator. In addition, due to system channel allocation delays, the receiving device may not be able to transmit its acknowledgment packet for several seconds after computing the data integrity indicator. During the period it is waiting for channel access, the receiving device might receive additional data packets. Therefore, by inserting the receive tracking number into the acknowledgment packet at the latest possible moment prior to transmission, the receiving device truly acknowledges the most recently received data packet.

Upon computing the data integrity indicator, the receiving device inputs (311) the data integrity indicator into the acknowledgment data packet. In the preferred embodiment, the receiving device inputs the data integrity indicator into a portion of the last data block of the acknowledgment data packet. However, in an alternative embodiment, the receiving device might input the data integrity indicator into a predetermined portion of another data block of the acknowledgment data packet. In addition to inputting the data integrity indicator into the acknowledgment, the receiving device also inputs (311) the receive tracking number into the portion of the acknowledgment packet containing the predetermined value. In the preferred embodiment, the receiving device inserts the receive tracking number in a portion of the first data block of the acknowledgment data packet. However, like the positioning of the data integrity indicator, the receiving device might alternatively input the receive tracking number into a portion of another data block of the acknowledgment data packet, provided that the receive tracking number replaces the predetermined value previously inputted prior to computation of the data integrity indicator.

In a preferred embodiment, when the acknowledgment data packet is finally configured, the receiving device requests (313) the radio channel for transmission of the acknowledgment data packet. Responsive to the request, the receiving device receives (315) a channel grant and transmits (317) the acknowledgment data packet to the sending device, and the logic flow ends (319). In an alternative, a receiving device that employs a processor having state-of-the-art speed might request the radio channel and receive the channel grant prior to inputting the receive tracking number into the acknowledgment packet to allow the receive tracking number to more accurately account for recently received data packets.

In a preferred embodiment, steps 305–311 and a portion of step 313 (e.g., generation of a channel request message) of the above logic flow diagram 300 are performed by a computer program that is stored in a computer-readable memory device of the receiving communication device.

The present invention encompasses a method and apparatus for tracking data packets in a packet data communication system. With this invention, the probability of introducing errors into the values of the transmit and receive tracking numbers resulting from the inherent delays that occur in the normal operation of the system components is substantially reduced. By updating the transmission tracking number after radio transmission of the data packet and inputting the receive tracking number into the acknowledgment just prior to transmission, the present invention permits the respective tracking numbers to accurately reflect the transmission and reception status of the data packets at the sending and receiving communication devices, respectively. Further, by computing the acknowledgment's FCS without including the receive tracking number, the present invention provides for the use of known error detection techniques, while insuring that the receive tracking number can be inserted into the acknowledgment at the latest possible instant prior to transmission to obtain the aforesaid tracking accuracy benefit.

While the present invention has been particularly shown and described with reference to particular embodiments thereof, it will be understood by those skilled in the art that various changes in form and details may be made therein without departing from the spirit and scope of the present invention.

We claim:

1. A method for tracking data packets in a packet data communication system, the method comprising the steps of:

transmitting, by a first communication device, a data packet to a second communication device;

increasing, by the first communication device responsive to the step of transmitting, a transmit tracking number, wherein the transmit tracking number indicates a packet sequence number of a data packet that is next in sequence to be transmitted;

receiving, by the second communication device, the data packet transmitted by the first communication device;

transmitting, by the second communication device, an acknowledgment data packet to the first communication device, wherein the acknowledgment data packet includes a receive tracking number that indicates a packet sequence number of a data packet that is next in sequence to be received;

receiving, by the first communication device, the acknowledgment data packet;

comparing, by the first communication device, the receive tracking number and the transmit tracking number; and when the receive tracking number is greater than the transmit tracking number, determining that a communication error occurred.

2. The method of claim 1, wherein the communication error comprises a software error that occurred in at least one of the first communication device and the second communication device.

3. The method of claim 1, further comprising the step of determining that a communication error did not occur when the receive tracking number is less than or equal to the transmit tracking number.

4. The method of claim 1, wherein the acknowledgment data packet comprises a plurality of data blocks, the method further comprising the steps of:

at the second communication device and prior to the step of transmitting the acknowledgment data packet:

inputting a predetermined value into a portion of a first data block of the plurality of data blocks reserved for the receive tracking number;

determining a data integrity indicator for the plurality of data blocks;

inputting the data integrity indicator into a portion of a second data block of the plurality of data blocks; and replacing the predetermined value with the receive tracking number, such that the acknowledgment data packet, when transmitted, includes the receive tracking number and the data integrity indicator.

5. The method of claim 4, further comprising the steps of:

at the first communication device and responsive to the step of receiving the acknowledgment data packet:

replacing the receive tracking number with the predetermined value;

determining a second data integrity indicator for the plurality of data blocks;

comparing the second data integrity indicator with the data integrity indicator in the second data block;

when the second data integrity indicator does not equal the data integrity indicator in the second data block, determining that the acknowledgment data packet is corrupted.

6. The method of claim 1, wherein the acknowledgment data packet comprises a plurality of data blocks, the method further comprising the steps of:

at the second communication device and prior to the step of transmitting the acknowledgment data packet:

determining a data integrity indicator for the plurality of data blocks less a portion of a first data block of the plurality of data blocks reserved for the receive tracking number;

inputting the data integrity indicator into a portion of a second data block of the plurality of data blocks; and inputting the receive tracking number into the portion of the first data block reserved for the receive tracking number, such that the acknowledgment data packet, when transmitted, includes the receive tracking number and the data integrity indicator.

7. The method of claim 6, further comprising the steps of:

at the first communication device and responsive to the step of receiving the acknowledgment data packet:

determining a second data integrity indicator for the plurality of data blocks less the portion of the first data block containing the receive tracking number;

comparing the second data integrity indicator with the data integrity indicator in the portion of the second data block; and when the second data integrity indicator does not equal the data integrity indicator in the portion of the second data block, determining that the acknowledgment data packet is corrupted.

8. A method for a first communication device to track data packets transmitted to a second communication device, the method comprising the steps of:

transmitting a data packet to the second communication device;

increasing, responsive to the step of transmitting, a transmit tracking number, wherein the transmit tracking number indicates a packet sequence number of a data packet that is next in sequence to be transmitted;

receiving an acknowledgment data packet from the second communication device, wherein the acknowledgment data packet includes a receive tracking number that indicates a packet sequence number of a data packet that is next in sequence to be received by the second communication device;

comparing, by the first communication device, the receive tracking number and the transmit tracking number; and when the receive tracking number is greater than the transmit tracking number, determining that a communication error occurred.

9. The method of claim 8, further comprising the step of determining that a communication error did not occur when the receive tracking number is less than or equal to the transmit tracking number.

10. The method of claim 8, wherein the acknowledgment data packet comprises a plurality of data blocks and wherein the method further comprises the steps of:

responsive to the step of receiving the acknowledgment data packet:

replacing the receive tracking number with a predetermined value;

determining a first data integrity indicator for the plurality of data blocks;

comparing the first data integrity indicator with a second data integrity indicator that is positioned within a predetermined data block of the plurality of data blocks; and when the first data integrity indicator does not equal the second data integrity indicator, determining that the acknowledgment data packet is corrupted.

11. The method of claim 8, wherein the acknowledgment data packet comprises a plurality of data blocks and wherein the method further comprises the steps of:

responsive to the step of receiving the acknowledgment data packet:

determining a first data integrity indicator for the plurality of data blocks less a portion of a first data block of the plurality of data blocks containing the receive tracking number;

comparing the first data integrity indicator with a second data integrity indicator that is positioned within a portion of a second data block of the plurality of data blocks; and when the first data integrity indicator does not equal the second data integrity indicator, determining that the acknowledgment data packet is corrupted.

12. A method for a first communication device to track data packets received from a second communication device, the method comprising the steps of:

receiving a data packet transmitted by the second communication device;

generating an acknowledgment data packet, wherein the acknowledgment data packet comprises at least one data block;

inputting a predetermined value into a portion of the at least one data block reserved for a receive tracking number, wherein the receive tracking number indicates a packet sequence number of a data packet that is next in sequence to be received;

determining a data integrity indicator for the at least one data block;

inputting the data integrity indicator into a portion of the at least one data block reserved for the data integrity indicator;

determining the receive tracking number;

replacing the predetermined value with the receive tracking number; and transmitting the acknowledgment data packet to the second communication device, such that the acknowledgment data packet includes the receive tracking number and the data integrity indicator.

13. The method of claim 12, wherein the acknowledgment data packet comprises a plurality of data blocks and further includes user data of the first communication device.

14. A communication device in a packet data communication system, the communication device comprising:

a transmitter that transmits a data packet to a target communication device;

a receiver that receives an acknowledgment data packet indicating receipt of the data packet from the target communication device, the acknowledgment data packet including a receive tracking number that indicates a packet sequence number of a data packet that is next in sequence to be received by the target communication device; and a computer readable memory device, coupled to the transmitter and the receiver, that has stored therein a computer program that, when executed, performs the following functions:

increases a transmit tracking number upon transmission of the data packet, wherein the transmit tracking number indicates a packet sequence number of a data packet that is next in sequence to be transmitted by the communication device; and upon reception of the acknowledgment data packet, compares the receive tracking number to the transmit tracking number and when the receive tracking number is greater than the transmit tracking number, determines that a communication error occurred.

15. The communication device of claim 14, wherein the communication device comprises a base station.

16. The communication device of claim 15, wherein the communication device further comprises a data controller.

17. The communication device of claim 14, wherein the communication device comprises a mobile or portable two-way radio device.

18. In a packet data communication system that includes a wireless communication unit and a data controller operably coupled to a base station, a method for the data controller to track data packets transmitted to the wireless communication unit, the method comprising the steps of:

providing, by the data controller, a data packet to the base station;

receiving, by the data controller, a confirmation message from the base station indicating that the data packet has been transmitted;

updating, by the data controller, responsive to the confirmation message, a transmit tracking number, wherein the transmit tracking number indicates a packet sequence number of a data packet that is next in sequence to be transmitted;

receiving, by the data controller via the base station, an acknowledgment data packet from the wireless communication unit, wherein the acknowledgment data packet includes a receive tracking number that indicates a packet sequence number of a data packet that is next in sequence to be received by the wireless communication unit; and when the receive tracking number is later in sequence than the transmit tracking number, determining, by the data controller, that a communication error occurred.

* * * * *